United States Patent
Akiyama

(10) Patent No.: US 12,542,557 B2
(45) Date of Patent: Feb. 3, 2026

(54) IMAGE PROCESSING DEVICE

(71) Applicant: LAPIS Technology Co., Ltd., Yokohama (JP)

(72) Inventor: Takaaki Akiyama, Tokyo (JP)

(73) Assignee: LAPIS TECHNOLOGY CO., LTD., Yokohama (JP)

( * ) Notice: Subject to any disclaimer, the term of this patent is extended or adjusted under 35 U.S.C. 154(b) by 0 days.

(21) Appl. No.: 18/807,120

(22) Filed: Aug. 16, 2024

(65) Prior Publication Data

US 2025/0070788 A1    Feb. 27, 2025

(30) Foreign Application Priority Data

Aug. 21, 2023 (JP) .................. 2023-134112

(51) Int. Cl.
   *H03D 3/24* (2006.01)
   *H03L 7/095* (2006.01)
   *H03L 7/099* (2006.01)

(52) U.S. Cl.
   CPC ............ *H03L 7/0991* (2013.01); *H03L 7/095* (2013.01)

(58) Field of Classification Search
   CPC ..... H03L 7/0991; H03L 7/095; H04N 9/8047; H04N 21/44209; H04N 5/956; H04N 9/896; H04N 5/126; H04H 20/30; G11B 19/02; G09G 5/005
   USPC .................................................. 375/373–376
   See application file for complete search history.

(56) References Cited

U.S. PATENT DOCUMENTS

| | | | | |
|---|---|---|---|---|
| 4,837,637 A * | 6/1989 | Akiyama | ............... | G11B 19/02 |
| | | | | 386/E5.033 |
| 4,841,379 A * | 6/1989 | Akiyama | ............... | H04N 9/896 |
| | | | | 386/327 |
| 4,853,781 A * | 8/1989 | Okano | .................... | H04N 5/956 |
| | | | | 348/715 |
| 4,853,914 A * | 8/1989 | Okano | .................... | H04N 5/956 |
| | | | | 386/318 |
| 5,565,928 A * | 10/1996 | Saeger | ................... | H04N 5/126 |
| | | | | 348/542 |
| 5,699,360 A * | 12/1997 | Nishida | .................. | H04H 20/30 |
| | | | | 370/503 |

(Continued)

FOREIGN PATENT DOCUMENTS

JP    2019-071066 A    5/2019

*Primary Examiner* — Phuong Phu
(74) *Attorney, Agent, or Firm* — Rabin & Berdo, P.C.

(57) ABSTRACT

The disclosure includes a memory, a horizontal synchronization detection circuit, a phase comparator, a lock circuit, a PLL, and a frequency divider. The memory that reads out a written video signal in response to a read clock signal and outputs it as an output video signal. The horizontal synchronization detection circuit detects a horizontal synchronization signal from the video signal. The phase comparator generates a phase difference signal indicating a phase difference between the horizontal synchronization signal and a frequency-divided clock signal. The lock circuit receives a free-running clock signal and generates a reference clock signal in which a phase signal is shifted by an amount of the phase difference indicated by the phase difference signal. The PLL generates the read clock signal that is locked to the phase of the reference clock signal. The frequency divider generates the frequency-divided clock signal by dividing the read clock signal.

10 Claims, 6 Drawing Sheets

(56) References Cited

U.S. PATENT DOCUMENTS

| | | | | |
|---|---|---|---|---|
| 5,986,720 | A | * | 11/1999 | Kishigami ....... H04N 21/44209 348/E5.077 |
| 6,538,648 | B1 | * | 3/2003 | Koike .................... G09G 5/005 348/520 |
| 7,127,157 | B1 | * | 10/2006 | Saito .................... H04N 9/8047 386/326 |
| 2002/0018038 | A1 | * | 2/2002 | Onishi ................... G09G 5/005 345/98 |

* cited by examiner

IMAGE PROCESSING DEVICE

BACKGROUND

Cross-Reference to Related Application

This application is based upon and claims the benefit of priority from the prior Japanese Patent Application No. 2023-134112 filed on Aug. 21, 2023, the entire contents of which are incorporated herein by reference.

1. TECHNICAL FIELD

The disclosure relates to an image processing device that synchronizes and outputs video signals.

2. DESCRIPTION OF THE RELATED ART

Recently, vehicles such as automobiles have been equipped with a display system including a camera that captures the outside of the vehicle and a display device that displays based on video signals captured by the camera.

In the display device, an image processing device that adjusts an input video signal to adapt to its own timing is disposed (for example, see JP-A-2019-71066). The image processing device uses a frame memory as a buffer memory to perform such adjustments. For example, the synchronization timing of video signals is adjusted by writing the video signals into the frame memory while reading the video signals at a predetermined timing from the frame memory.

Incidentally, if a read speed from the frame memory is faster than a write speed, the frame memory may become empty. Therefore, in order to avoid such a situation, in the image processing device, reading is performed after input video signals are written for an amount of one frame or two frames. As a result, video signals output after a delay period for the amount of one frame or two frames relative to the input video signals are supplied to the display device, and there has been a problem that the time lag of image display relative to the input video signals is large.

Therefore, an object of the disclosure is to provide an image processing device that allows reducing a delay period of an output video signal relative to an input video signal.

SUMMARY

An image processing device according to the disclosure includes a memory, a horizontal synchronization detection circuit, a phase comparator, a lock circuit, a PLL, and a frequency divider. A video signal is written into the memory when the video signal is input. The written video signal is read at a timing of a read clock signal from the memory and output as an output video signal. The horizontal synchronization detection circuit detects a horizontal synchronization signal from the video signal. The phase comparator generates a phase difference signal indicating a phase difference between a phase of the horizontal synchronization signal and a phase of a frequency-divided clock signal. The lock circuit receives a free-running clock signal and generates a reference clock signal in which a phase of the free-running clock signal is shifted by an amount of the phase difference indicated by the phase difference signal. The PLL generates an oscillation signal having a dot frequency and generates a signal in which a phase of the oscillation signal is locked to a phase of the reference clock signal as the read clock signal. The frequency divider supplies the phase comparator with a clock signal in which a frequency of the read clock signal is divided as the frequency-divided clock signal.

An image processing device according to the disclosure includes a memory, a horizontal synchronization detection circuit, a multiplication circuit, a phase comparator, a lock circuit, a PLL, and a frequency divider. A video signal is written into the memory when the video signal is input. The written video signal is read at a timing of a read clock signal from the memory and output as an output video signal. The horizontal synchronization detection circuit detects a horizontal synchronization signal from the video signal. The multiplication circuit generates a signal in which a frequency of the horizontal synchronization signal is multiplied by N (where N is a real number greater than or equal to 2) as a horizontal synchronization multiplication signal. The phase comparator generates a phase difference signal indicating a phase difference between a phase of the horizontal synchronization multiplication signal and a phase of a frequency-divided clock signal. The lock circuit receives a free-running clock signal and generates a reference clock signal in which a phase of the free-running clock signal is shifted by an amount of the phase difference indicated by the phase difference signal. The PLL generates an oscillation signal having a dot frequency and generates a signal in which a phase of the oscillation signal is locked to a phase of the reference clock signal as the read clock signal. The frequency divider supplies the phase comparator with a clock signal in which a frequency of the read clock signal is divided as the frequency-divided clock signal.

DETAILED DESCRIPTION

In the disclosure, in writing an input video signal into the memory while reading and outputting it as an output video signal, a read clock signal phase-synchronized with the horizontal synchronization signal of the input video signal is generated, and the video signal is read from the memory at a timing of the read clock signal.

This allows the delay period of the output video signal relative to the input video signal to be less than a display period of one frame.

The following describes an embodiment of the disclosure in detail with reference to the drawings.

Figure 1:
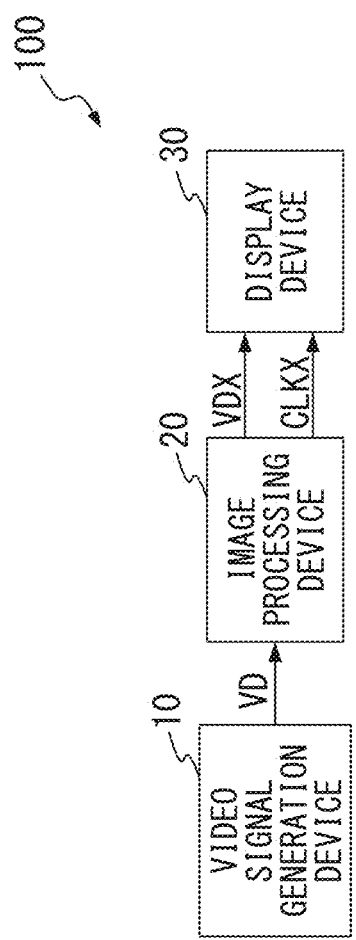
FIG. 1 is a block diagram illustrating a configuration of a video system 100 including an image processing device according to the disclosure.

FIG. 1 is a block diagram illustrating a configuration of a video system 100 including an image processing device according to the disclosure.

As illustrated in FIG. 1, the video system 100 includes a video signal generation device 10, an image processing device 20, and a display device 30.

The video signal generation device 10 is constituted of, for example, a DVD or Blu-ray player (recorder), a television tuner, a camera, and the like and supplies the image processing device 20 with a video signal acquired or replayed by itself as a video signal VD. The video signal VD contains a series of pixel data pieces indicating a luminance level at each pixel that constitutes a screen of the display device 30.

When the image processing device 20 receives the video signal VD from the video signal generation device 10, it generates an output clock signal CLKX as a clock signal used on the display device 30 side and an output video signal VDX synchronized with the phase of the output clock signal CLKX based on the video signal VD. Then, the image processing device 20 outputs the output clock signal CLKX and the output video signal VDX to the display device 30.

The display device 30 is, for example, a display using liquid crystal, organic EL, or the like, retrieves the output video signal VDX at a timing synchronized with the output clock signal CLKX, and displays an image based on the output video signal VDX.

Figure 2:
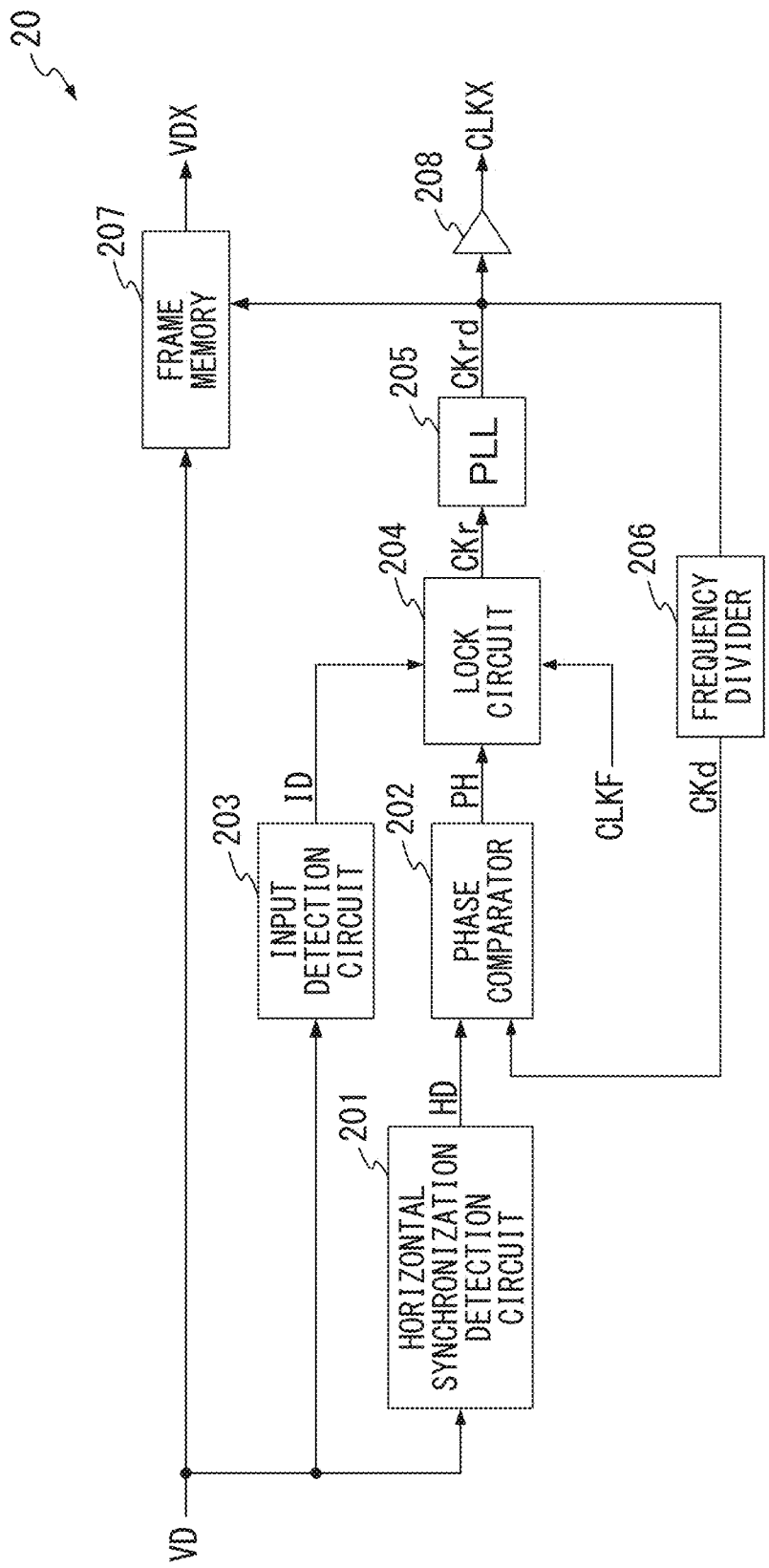
FIG. 2 is a block diagram illustrating an exemplary internal configuration of an image processing device 20.

FIG. 2 is a block diagram illustrating an exemplary internal configuration of the image processing device 20.

As illustrated in FIG. 2, the image processing device 20 includes a horizontal synchronization detection circuit 201, a phase comparator 202, an input detection circuit 203, a lock circuit 204, a phase locked loop (PLL) 205, a frequency divider 206, a frame memory 207, and a clock buffer 208.

The horizontal synchronization detection circuit 201 detects a horizontal synchronization signal from within the video signal VD and supplies it as a horizontal synchronization signal HD to the phase comparator 202.

The phase comparator 202 compares the phase of the horizontal synchronization signal HD with the phase of the frequency-divided clock signal CKd supplied by the frequency divider 206 and supplies the lock circuit 204 with a phase difference signal PH representing the phase difference between both phases.

Figure 3:
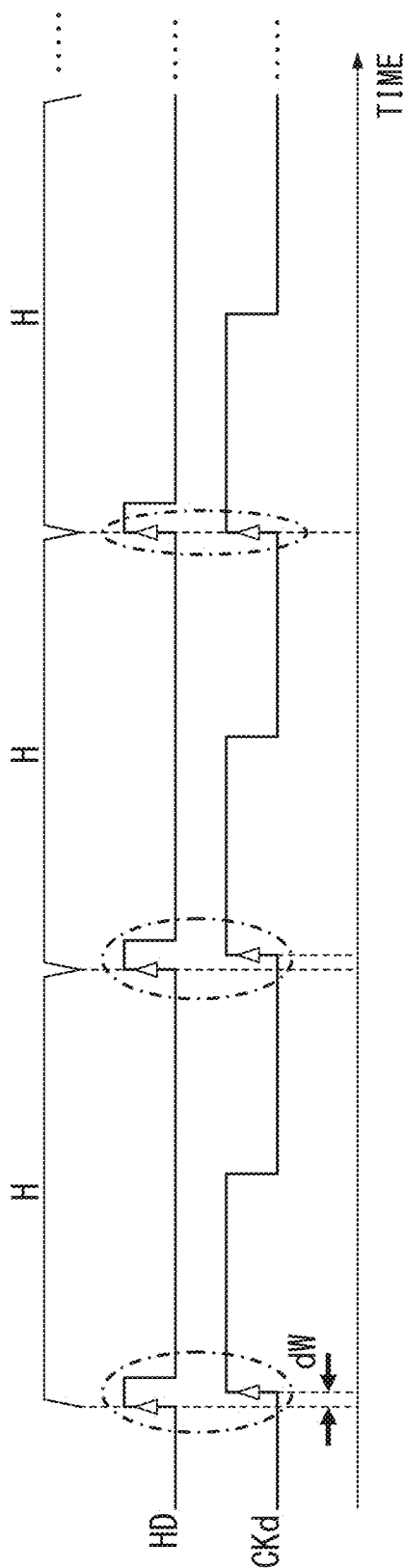
FIG. 3 is a timing chart illustrating an example of waveforms of a horizontal synchronization signal HD and a frequency-divided clock signal CKd.

For example, as illustrated in FIG. 3, when a time point of a rising edge portion of the frequency-divided clock signal CKd (indicated by a white triangle mark) is delayed by dW relative to a time point of a rising edge portion of the horizontal synchronization signal HD (indicated by a white triangle mark) that appears every horizontal synchronization cycle H, the phase comparator 202 supplies the lock circuit 204 with the phase difference signal PH representing (-dW) as the phase difference. When the time point of the rising edge portion of the frequency-divided clock signal CKd is ahead by dW relative to the time point of the rising edge portion of the horizontal synchronization signal HD, the phase comparator 202 supplies the lock circuit 204 with the phase difference signal PH representing (dW) as the phase difference.

The input detection circuit 203 generates an input detection signal ID indicating "input present" when the video signal VD is received, that is, when a video signal is input. On the other hand, the input detection circuit 203 generates an input detection signal ID indicating "no input present" when the video signal VD is not input, that is, when there is no input. The input detection circuit 203 supplies the lock circuit 204 with the generated input detection signal ID.

The lock circuit 204 receives a free-running clock signal CLKF along with the phase difference signal PH and the input detection signal ID. The free-running clock signal CLKF is, for example, a free-running clock signal generated by oscillation operation of an oscillator circuit (not illustrated) disposed outside the image processing device 20.

When the input detection signal ID indicates "input present," the lock circuit 204 generates a reference clock signal CKr locked to the phase of the video signal VD by shifting the phase of the free-running clock signal CLKF by an amount of the phase difference indicated by the phase difference signal PH and supplies it to the PLL 205.

On the other hand, when the input detection signal ID indicates "no input present," the lock circuit 204 supplies the PLL 205 with the free-running clock signal CLKF as the reference clock signal CKr.

The PLL 205 generates an oscillation signal having a dot frequency of the input video signal VD and supplies the frequency divider 206, the frame memory 207, and the clock buffer 208 with a signal in which the phase of the oscillation signal is locked to the phase of the reference clock signal CKr as a read clock signal CKrd.

The frequency divider 206 generates a clock signal having a horizontal synchronization frequency by dividing the frequency of the read clock signal CKrd and supplies it as the frequency-divided clock signal CKd to the phase comparator 202.

When the video signal VD is input, each of the pixel data pieces contained in the video signal VD is retrieved in order and written into the frame memory 207, and a signal in which the written pixel data pieces are read at a timing of the read clock signal CKrd in the written order is output to the display device 30 as the output video signal VDX.

The clock buffer 208 outputs a signal with the read clock signal CKrd amplified to the display device 30 as the above-described output clock signal CLKX.

With the configuration, when the video signal VD is input, the image processing device 20 writes it into the frame memory 207 and outputs the output video signal VDX, in which the written video signal VD is read at the timing of phase synchronization with the horizontal synchronization signal HD of the input video signal VD, to the display device 30. Furthermore, along with the output video signal VDX, the output clock signal CLKX phase-synchronized with the horizontal synchronization signal HD of the video signal VD is output to the display device 30. On the other hand, when the video signal VD is not input, the image processing device 20 outputs the output clock signal CLKX phase-synchronized with the free-running clock signal CLKF to the display device 30.

Figure 4:
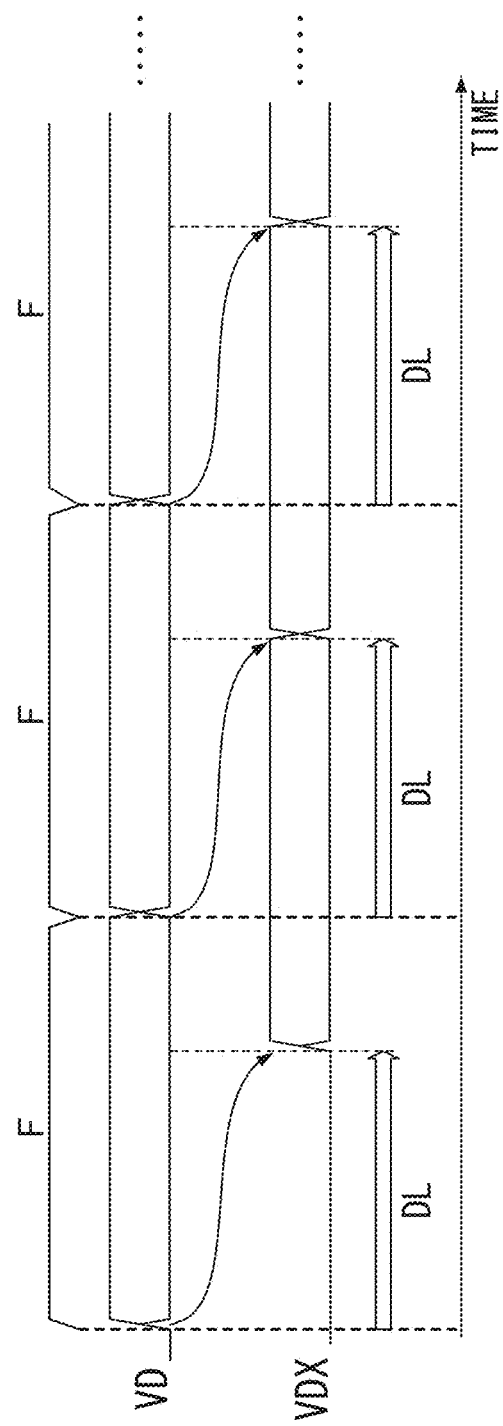
FIG. 4 is a timing chart representing an aspect of delay of an output video signal VDX output by the image processing device 20 according to an input video signal VD.

Therefore, the above-described operation of the image processing device 20 allows a delay period DL of the output video signal VDX to be supplied to the display device 30 relative to the input video signal VD to be shorter than a one-frame display period F as illustrated in FIG. 4.

Incidentally, when the configuration illustrated in FIG. 2 is employed as the image processing device 20, the phase comparison between the horizontal synchronization signal HD of the video signal VD and the frequency-divided clock signal CKd is performed once every horizontal synchronization cycle H, as illustrated in FIG. 3. At this time, the higher the number of phase comparisons performed per unit time, the more accurate the phase synchronization can be. Therefore, for example, an increase in frequency is performed on the dot frequency, that is, a sampling frequency of pixel data pieces in the video signal VD.

However, when a high-speed video signal conforming to standards, such as Low Voltage Differential Signaling (LVDS) and Mobile Industry Processor Interface (MIPI), is an input target, it is difficult to increase the sampling frequency without compromising sampling accuracy.

Figure 5:
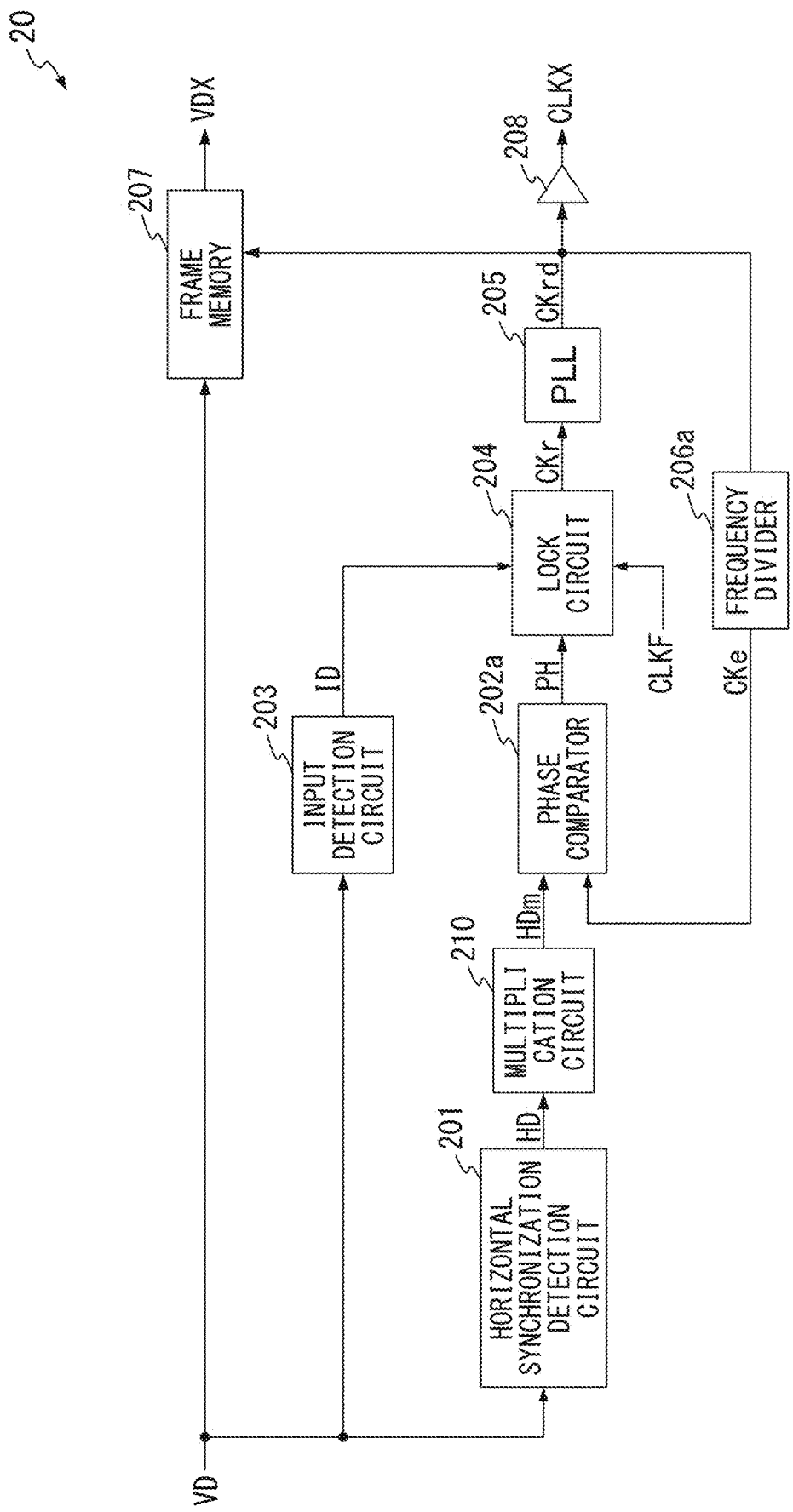
FIG. 5 is a block diagram illustrating another exemplary internal configuration of the image processing device 20.

FIG. 5 is a block diagram illustrating another exemplary internal configuration of the image processing device 20 that can generate the output video signal VDX phase-synchronized with the input video signal VD with high accuracy even when such a high-speed video signal is an input target.

In the configuration illustrated in FIG. 5, the other configuration is the same as that illustrated in FIG. 2 except that a multiplication circuit 210 is newly added, and a phase comparator 202a and a frequency divider 206a are employed instead of the phase comparator 202 and the frequency divider 206.

Therefore, the operation of the image processing device 20 having the configuration illustrated in FIG. 5 is described below with a focus on the multiplication circuit 210, the phase comparator 202a, and the frequency divider 206a.

The multiplication circuit 210 receives the horizontal synchronization signal HD detected by the horizontal synchronization detection circuit 201 and supplies the phase comparator 202a with a signal in which the frequency of the horizontal synchronization signal HD is multiplied by N (where N is a positive real number other than 0) as a horizontal synchronization multiplication signal HDm.

The frequency divider 206a supplies the phase comparator 202a with a frequency-divided clock signal CKe in which the frequency of the read clock signal CKrd output from the PLL 205 is divided so that the frequency after being divided is N (where N is a positive real number other than 0) times the horizontal synchronization frequency.

The phase comparator 202a compares the phase of the horizontal synchronization multiplication signal HDm with the phase of the frequency-divided clock signal CKe and supplies the lock circuit 204 with a phase difference signal PH representing the phase difference between both phases.

Figure 6:
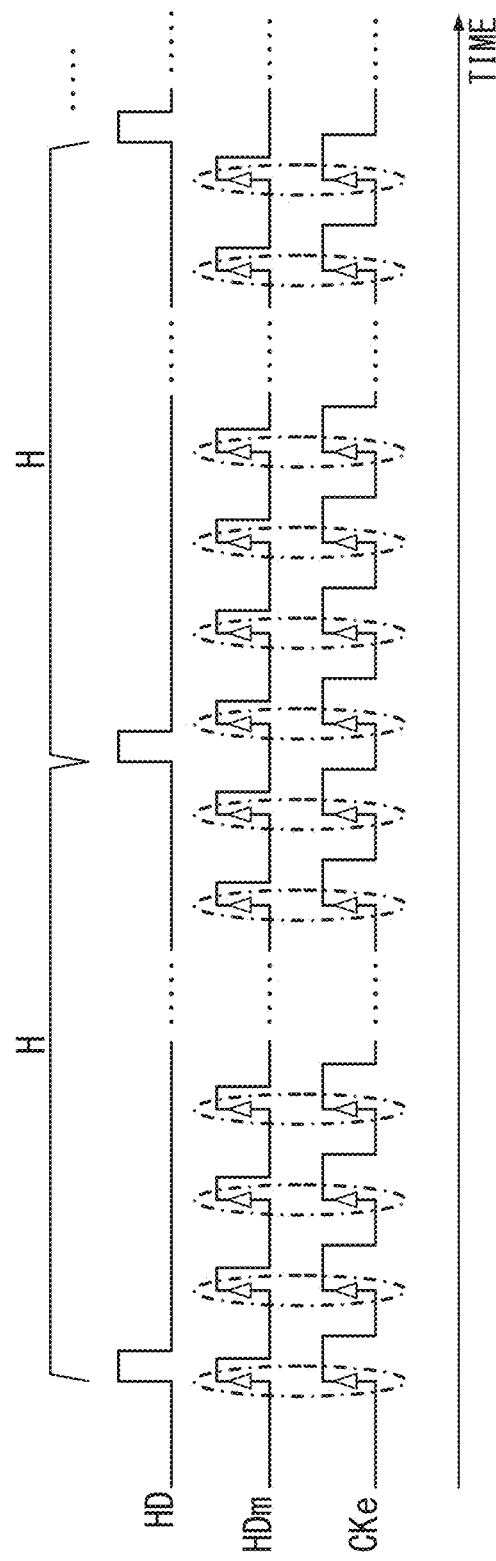
FIG. 6 is a timing chart illustrating an example of waveforms of a horizontal synchronization multiplication signal HDm and a frequency-divided clock signal CKe.

That is, as illustrated in FIG. 6, the phase comparator 202a supplies the lock circuit 204 with the phase difference signal PH representing the phase difference of rising edge portions of the frequency-divided clock signal CKe (indicated by white triangle marks) relative to rising edge portions of the horizontal synchronization multiplication signal HDm (indicated by white triangle marks) that appear N times during each horizontal synchronization cycle H.

Accordingly, with the configuration illustrated in FIG. 5, the number of phase comparisons performed during each horizontal synchronization cycle H is N times that of the case where the configuration illustrated in FIG. 2 is employed. Therefore, the output video signal VDX phase-synchronized with a high-speed input video signal conforming to standards, such as LVDS and MIPI, with high accuracy can be generated.

In the configuration illustrated in FIG. 2 or FIG. 5, the read clock signal CKrd and the output clock signal CLKX are generated using the free-running clock signal CLKF supplied externally. However, an oscillator circuit that generates the free-running clock signal CLKF may be disposed in the image processing device 20.

It is understood that the foregoing description and accompanying drawings set forth the preferred embodiments of the disclosure at the present time. Various modifications, additions and alternative designs will, of course, become apparent to those skilled in the art in light of the foregoing teachings without departing from the spirit and scope of the disclosure. Thus, it should be appreciated that the disclosure is not limited to the disclosed Examples but may be practiced within the full scope of the appended claims.

What is claimed is:

1. An image processing device comprising:
   a memory into which a video signal is written when the video signal is input, the written video signal being read at a timing of a read clock signal from the memory and output as an output video signal;
   a horizontal synchronization detection circuit that detects a horizontal synchronization signal from the video signal;
   a phase comparator that generates a phase difference signal indicating a phase difference between a phase of the horizontal synchronization signal and a phase of a frequency-divided clock signal;
   a lock circuit that receives a free-running clock signal and generates a reference clock signal in which a phase of the free-running clock signal is shifted by an amount of the phase difference indicated by the phase difference signal;
   a PLL that generates an oscillation signal having a dot frequency and generates a signal in which a phase of the oscillation signal is locked to a phase of the reference clock signal as the read clock signal; and
   a frequency divider that supplies the phase comparator with a clock signal in which a frequency of the read clock signal is divided as the frequency-divided clock signal.

2. The image processing device according to claim 1, further comprising
   an input detection circuit that detects whether the video signal is input and generates an input detection signal indicating input present or no input present, wherein
   the lock circuit generates the reference clock signal by shifting a phase of the free-running clock signal by an amount of the phase difference indicated by the phase difference signal when the input detection signal indicates the input present and uses the free-running clock signal as the reference clock signal when the input detection signal indicates the no input present.

3. The image processing device according to claim 1, wherein
   the memory is a frame memory.

4. The image processing device according to claim 1, further comprising
   a clock buffer that externally outputs the read clock signal as an output clock signal.

5. The image processing device according to claim 1, wherein the video signal is input from a video signal generation device, and
   the read clock signal is output to a display device.

6. An image processing device comprising:
   a memory into which a video signal is written when the video signal is input, the written video signal being read at a timing of a read clock signal from the memory and output as an output video signal;
   a horizontal synchronization detection circuit that detects a horizontal synchronization signal from the video signal;
   a multiplication circuit that generates a signal in which a frequency of the horizontal synchronization signal is multiplied by N (where N is a real number greater than or equal to 2) as a horizontal synchronization multiplication signal;
   a phase comparator that generates a phase difference signal indicating a phase difference between a phase of the horizontal synchronization multiplication signal and a phase of a frequency-divided clock signal;

a lock circuit that receives a free-running clock signal and generates a reference clock signal in which a phase of the free-running clock signal is shifted by an amount of the phase difference indicated by the phase difference signal;

a PLL that generates an oscillation signal having a dot frequency and generates a signal in which a phase of the oscillation signal is locked to a phase of the reference clock signal as the read clock signal; and a frequency divider that supplies the phase comparator with a clock signal in which a frequency of the read clock signal is divided as the frequency-divided clock signal.

7. The image processing device according to claim 6, further comprising an input detection circuit that detects whether the video signal is input and generates an input detection signal indicating input present or no input present, wherein the lock circuit generates the reference clock signal by shifting a phase of the free-running clock signal by an amount of the phase difference indicated by the phase difference signal when the input detection signal indicates the input present and uses the free-running clock signal as the reference clock signal when the input detection signal indicates the no input present.

8. The image processing device according to claim 6, wherein the memory is a frame memory.

9. The image processing device according to claim 6, further comprising a clock buffer that externally outputs the read clock signal as an output clock signal.

10. The image processing device according to claim 6, wherein the video signal is input from a video signal generation device, and the read clock signal is output to a display device.

* * * * *